(12) United States Patent
Kono

(10) Patent No.: US 9,952,705 B2
(45) Date of Patent: Apr. 24, 2018

(54) INPUT APPARATUS

(75) Inventor: Kenji Kono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 12 days.

(21) Appl. No.: 13/392,861

(22) PCT Filed: Aug. 5, 2010

(86) PCT No.: PCT/JP2010/004940
§ 371 (c)(1),
(2), (4) Date: Feb. 27, 2012

(87) PCT Pub. No.: WO2011/024388
PCT Pub. Date: Mar. 3, 2011

(65) Prior Publication Data
US 2012/0154316 A1 Jun. 21, 2012

(30) Foreign Application Priority Data

Aug. 27, 2009 (JP) .................................. 2009-197318

(51) Int. Cl.
*G06F 3/041* (2006.01)
*G06F 3/01* (2006.01)

(52) U.S. Cl.
CPC ............ *G06F 3/0416* (2013.01); *G06F 3/016* (2013.01); *G06F 3/0414* (2013.01)

(58) Field of Classification Search
CPC ...... G06F 3/0481; G06F 3/0488; G06F 3/016; G06F 3/0414; G06F 3/0416
(Continued)

(56) References Cited

U.S. PATENT DOCUMENTS 6,078,308 A * 6/2000 Rosenberg ............. G05G 9/047
345/163
6,118,435 A 9/2000 Fujita et al.
(Continued)

FOREIGN PATENT DOCUMENTS

CN 101118469 A 2/2008
JP 10-293644 A 11/1998
(Continued)

OTHER PUBLICATIONS

The extended European Search Report dated Feb. 15, 2013, which corresponds to EP Application 10811447.1-1960 and is related to U.S. Appl. No. 13/392,861.
(Continued)

*Primary Examiner* — Michael J Jansen, II
(74) *Attorney, Agent, or Firm* — Studebaker & Brackett PC

(57) ABSTRACT

An input apparatus capable of providing, through a touch sensor, a tactile sensation as it were a sensation obtained when operating a key and the like constituted of a mechanical switch, includes a touch sensor configured to detect a contact, a load detection unit configured to detect a pressure load on a touch face of the touch sensor, a tactile sensation providing unit configured to vibrate the touch face, and a control unit configured to control drive of the tactile sensation providing unit, when a position of the contact detected by the touch sensor moves into a predetermined region while the pressure load detected by the load detection unit satisfies a predetermined standard, such that a tactile sensation is provided to an object pressing the touch face.

3 Claims, 10 Drawing Sheets

(58) Field of Classification Search
USPC .......................................................... 345/173
See application file for complete search history.

(56) References Cited

U.S. PATENT DOCUMENTS

| | | | | |
|---|---|---|---|---|
| 6,429,846 | B2* | 8/2002 | Rosenberg | A63F 13/06 345/156 |
| 7,205,978 | B2 | 4/2007 | Poupyrev et al. | |
| 7,245,293 | B2* | 7/2007 | Hoshino | G06F 3/016 178/18.01 |
| 7,283,120 | B2* | 10/2007 | Grant | G06F 3/016 200/5 R |
| 7,292,227 | B2 | 11/2007 | Fukumoto et al. | |
| 7,728,819 | B2* | 6/2010 | Inokawa | G06F 3/016 178/18.05 |
| 7,982,588 | B2* | 7/2011 | Makinen | G06F 3/016 340/407.2 |
| 8,120,584 | B2* | 2/2012 | Grivna | G06F 3/016 345/169 |
| 8,232,969 | B2* | 7/2012 | Grant | G06F 3/016 178/18.07 |
| 8,339,250 | B2* | 12/2012 | Je et al. | 340/407.2 |
| 8,686,952 | B2* | 4/2014 | Burrough | G06F 3/016 345/156 |
| 2001/0035854 | A1 | 11/2001 | Rosenberg et al. | |
| 2002/0033795 | A1* | 3/2002 | Shahoian | G06F 1/1616 345/156 |
| 2002/0149561 | A1* | 10/2002 | Fukumoto | G01C 21/3664 345/156 |
| 2002/0156807 | A1* | 10/2002 | Dieberger | G06F 3/016 715/247 |
| 2003/0067449 | A1* | 4/2003 | Yoshikawa | G06F 3/016 345/173 |
| 2003/0117371 | A1* | 6/2003 | Roberts | G06F 3/014 345/156 |
| 2003/0122779 | A1* | 7/2003 | Martin | G06F 1/1662 345/156 |
| 2003/0179190 | A1* | 9/2003 | Franzen | G06F 3/016 345/173 |
| 2004/0021643 | A1* | 2/2004 | Hoshino | G06F 3/016 345/173 |
| 2005/0030292 | A1* | 2/2005 | Diederiks | G09B 21/003 345/173 |
| 2005/0091609 | A1* | 4/2005 | Matthews et al. | 715/804 |
| 2005/0259087 | A1* | 11/2005 | Hoshino | G06F 3/016 345/173 |
| 2006/0028095 | A1* | 2/2006 | Maruyama et al. | 310/316.01 |
| 2006/0075471 | A1* | 4/2006 | Minowa et al. | 726/2 |
| 2006/0109256 | A1* | 5/2006 | Grant | G06F 3/016 345/173 |
| 2006/0119586 | A1* | 6/2006 | Grant | G06F 3/016 345/173 |
| 2006/0236263 | A1* | 10/2006 | Bathiche | G06F 3/016 715/786 |
| 2006/0238069 | A1* | 10/2006 | Maruyama et al. | 310/316.01 |
| 2006/0238510 | A1* | 10/2006 | Panotopoulos | G06F 3/0202 345/168 |
| 2006/0274036 | A1* | 12/2006 | Hioki | G06F 3/0412 345/156 |
| 2007/0013677 | A1* | 1/2007 | Rosenberg | A63F 13/06 345/173 |
| 2007/0080608 | A1* | 4/2007 | Maruyama et al. | 310/317 |
| 2007/0096594 | A1* | 5/2007 | Maruyama et al. | 310/317 |
| 2007/0146348 | A1* | 6/2007 | Villain | G06F 3/011 345/173 |
| 2007/0229455 | A1 | 10/2007 | Martin et al. | |
| 2007/0236450 | A1* | 10/2007 | Colgate | G06F 3/016 345/156 |
| 2008/0024459 | A1* | 1/2008 | Poupyrev et al. | 345/173 |
| 2008/0150905 | A1* | 6/2008 | Grivna | G06F 3/016 345/173 |
| 2008/0150911 | A1* | 6/2008 | Harrison | G06F 1/1626 345/173 |
| 2008/0238886 | A1* | 10/2008 | Bengtsson | G06F 3/016 345/177 |
| 2008/0303782 | A1* | 12/2008 | Grant et al. | 345/156 |
| 2009/0002328 | A1* | 1/2009 | Ullrich | G06F 3/016 345/173 |
| 2009/0015560 | A1* | 1/2009 | Robinson | G06F 3/016 345/168 |
| 2009/0079550 | A1* | 3/2009 | Makinen | G06F 3/016 340/407.2 |
| 2009/0122079 | A1* | 5/2009 | Nishioka | G06F 3/0481 345/619 |
| 2009/0135142 | A1* | 5/2009 | Fu et al. | 345/168 |
| 2009/0160793 | A1* | 6/2009 | Rekimoto | 345/173 |
| 2009/0284485 | A1* | 11/2009 | Colgate et al. | 345/173 |
| 2009/0322496 | A1* | 12/2009 | da Costa | G06F 3/016 340/407.2 |
| 2010/0039446 | A1* | 2/2010 | Hillis et al. | 345/629 |
| 2010/0085169 | A1* | 4/2010 | Poupyrev et al. | 340/407.2 |
| 2010/0127983 | A1* | 5/2010 | Irani | G06F 3/03543 345/163 |
| 2010/0156818 | A1* | 6/2010 | Burrough | G06F 3/016 345/173 |
| 2010/0177050 | A1* | 7/2010 | Heubel | G06F 3/016 345/173 |
| 2010/0214218 | A1* | 8/2010 | Vaisanen et al. | 345/163 |
| 2010/0309141 | A1* | 12/2010 | Cruz-Hernandez | G06F 3/016 345/173 |
| 2010/0309142 | A1* | 12/2010 | Cruz-Hernandez | G06F 3/016 345/173 |

FOREIGN PATENT DOCUMENTS

| | | |
|---|---|---|
| JP | 2003-288158 A | 10/2003 |
| JP | 2006-024039 A | 1/2006 |
| JP | 2008-130055 A | 6/2008 |
| WO | 2009/083928 A1 | 7/2009 |

OTHER PUBLICATIONS

Japanese Office Action "Notification of Reasons for Refusal" dated Feb. 12, 2013, which corresponds to Japanese Patent Application No. 2010-191434 and is related to U.S. Appl. No. 13/392,861 with translation.
S. Wada; Trial Decision; Japanese Office Action; Japanese Patent Application No. 2009-197318 with translation; dated Jan. 4, 2012.
A. Toyoda; Official Decision of Refusal; Japanese Office Action; Japanese Patent Application No. 2009-197318 with translation; dated Jun. 23, 2010.
Y.Morikawa; Notice of Reasons for Rejection; Japanese Office Action; Japanese Patent Application No. 2009-197318 with translation; dated Jan. 27, 2010.
S. Mizuno; Interrogation; Japanese Office Action; Japanese Patent Application No. 2009-197318 with translation; dated Jul. 15, 2011.
International Search Report; PCT/JP2010/004940; dated Sep. 7, 2010.
S.Mizuno; Japanese Office Action; Japanese Patent Application No. 2009-197318; dated Jul. 15, 2011.
An Office Action issued by the Korean Intellectual Property Office on May 28, 2013, which corresponds to Korean Patent Application No. 10-2012-7005021 and is related U.S. Appl. No. 13/392,861; with translation.
An Office Action issued by the Korean Patent Office dated Nov. 26, 2013, which corresponds to Korean Patent Application No. 10-2012-7005021 and is related U.S. Appl. No. 13/392,861; with English language statement of relevance.
An Office Action; "Decision of Rejection," issued by the Japanese Patent Office dated Oct. 25, 2013, which corresponds to Japanese Patent Application No. 2010-191434 and is related U.S. Appl. No. 13/392,861; with Concise Explanation.
An Office Action; "Decision of Rejection," issued by the Japanese Patent Office dated Oct. 15, 2013, which corresponds to Japanese Patent Application No. 2010-191434 and is related U.S. Appl. No. 13/392,861; with Concise Explanation.

(56) References Cited

OTHER PUBLICATIONS

An Office Action; "Communication pursuant to Article 94(3) EPC," issued by the European Patent Office dated Jun. 18, 2014, which corresponds to European Patent Application No. 10 811 447.1-1954 and is related to U.S. Appl. No. 13/392,861.
"Notification of the First Office Action" issued by the State Intellectual Property Office of China dated Mar. 5, 2014, which corresponds to Chinese Patent Application No. 201080038147.X and is related U.S. Appl. No. 13/392,861; with English language translation.
"Notification of the Fourth Office Action" issued by the State Intellectual Property Office of China dated Nov. 19, 2015, which corresponds to Chinese Patent Application No. 201080038147.X and is related U.S. Appl. No. 13/392,861; with English language translation.
EPO Notice of Opposition dated Sep. 29, 2016 which issued in corresponding EP Appl No. 10811447.1, 24 pp.

\* cited by examiner

FIG. 2
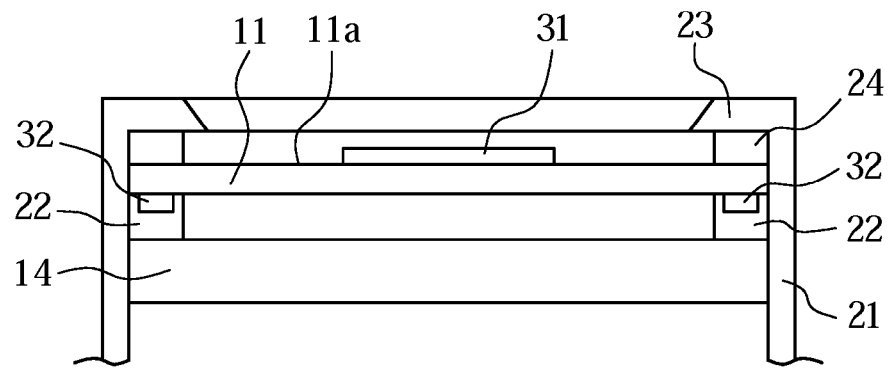
(a)
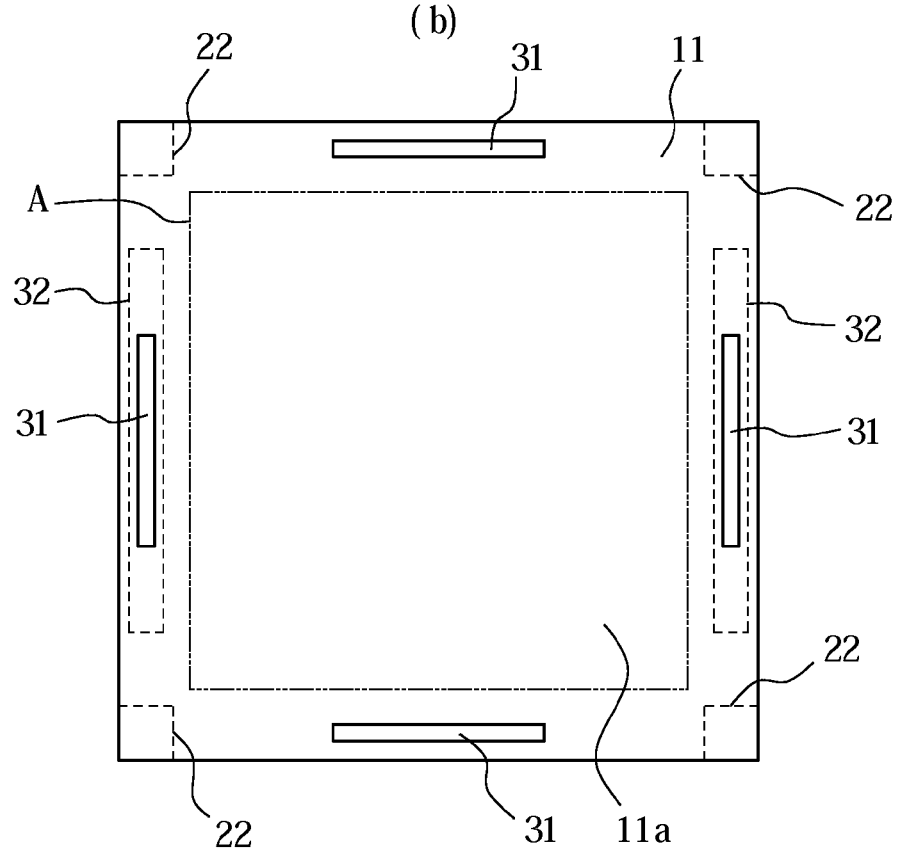
(b)

FIG. 5
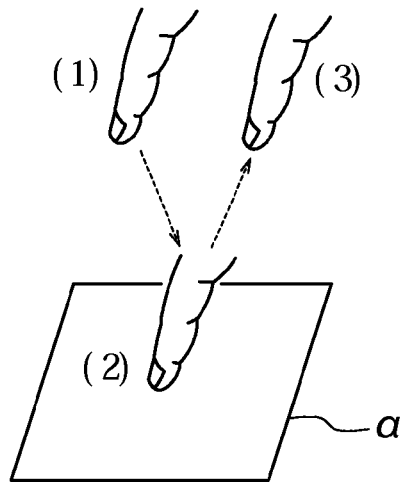
(A)
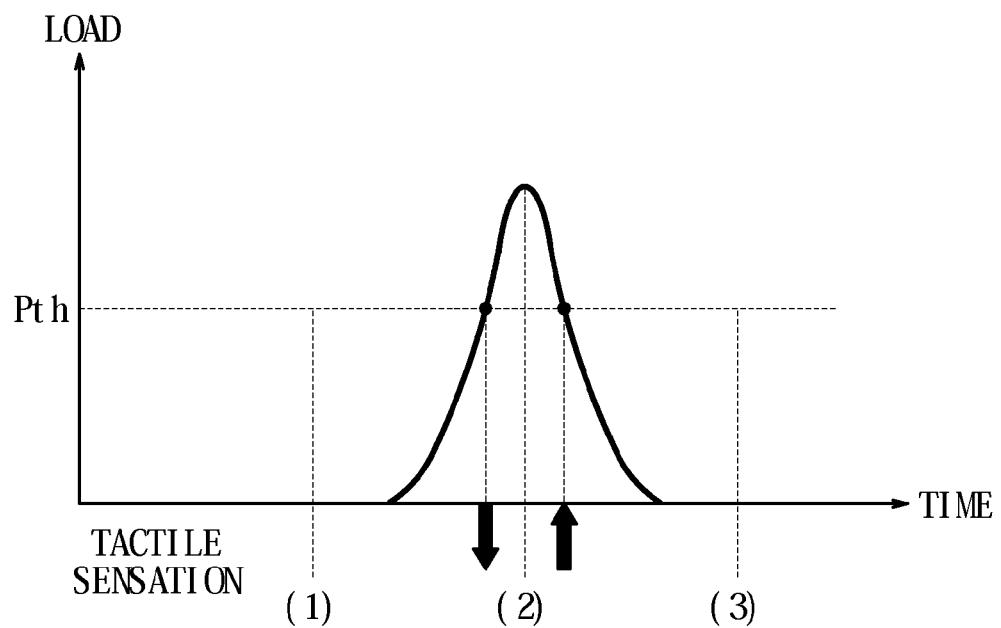
(B)

FIG. 6
(A)
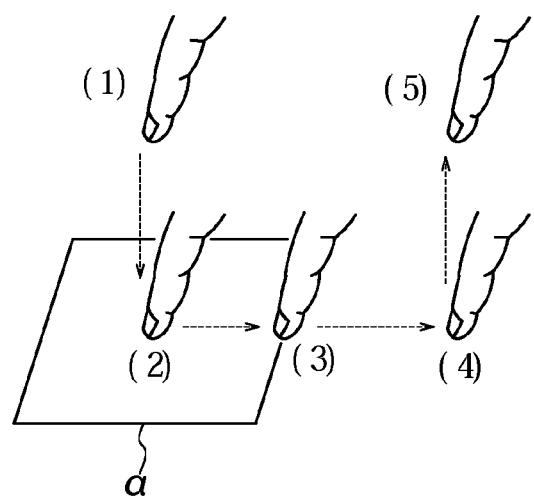
(B)
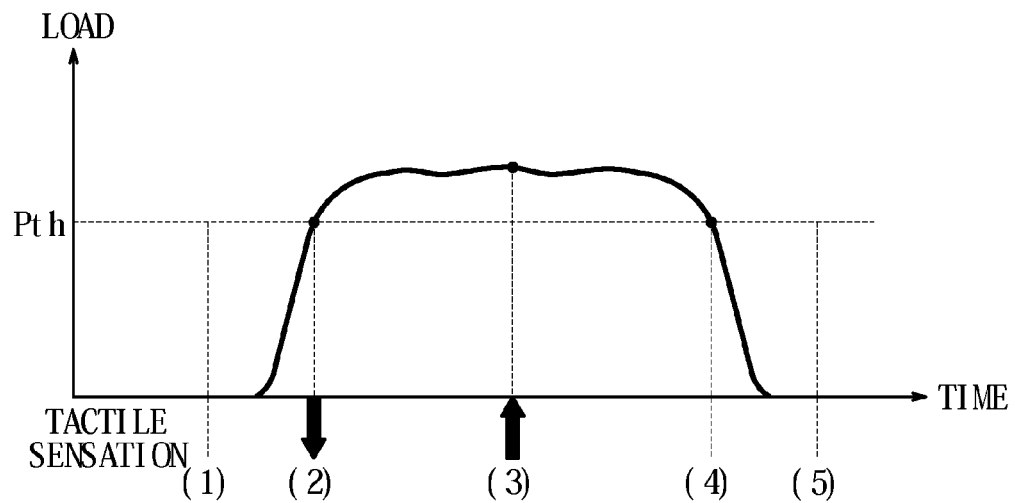

FIG. 7
(A)
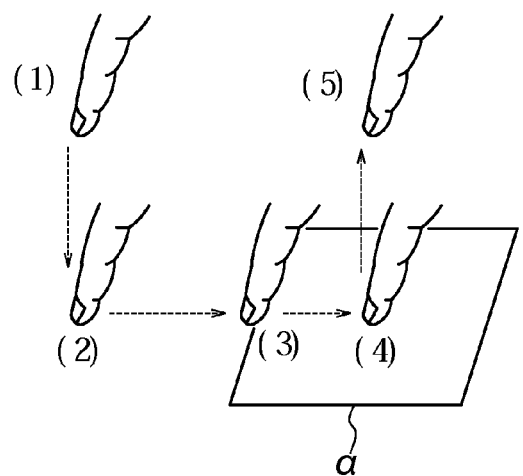
(B)
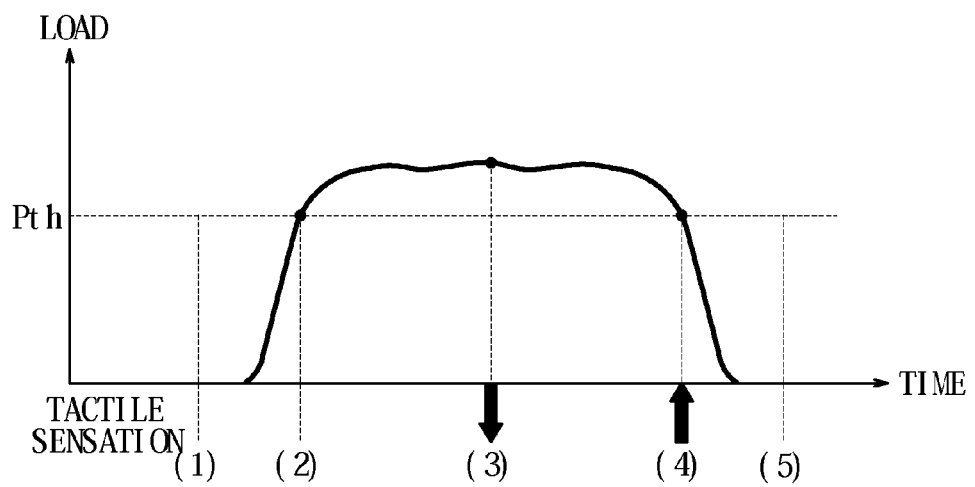

FIG. 8
(A)
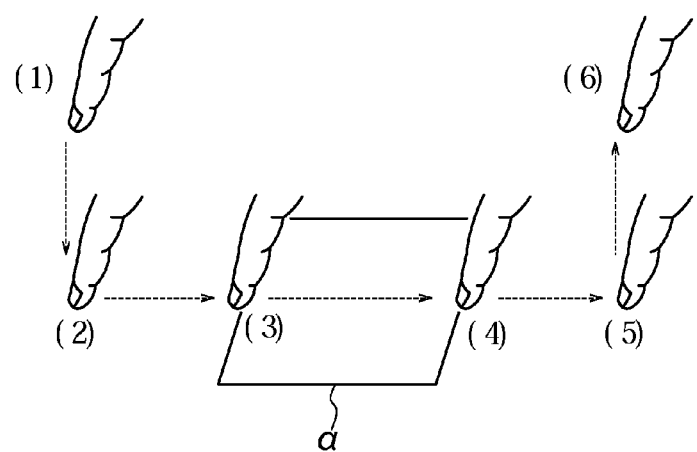
(B)
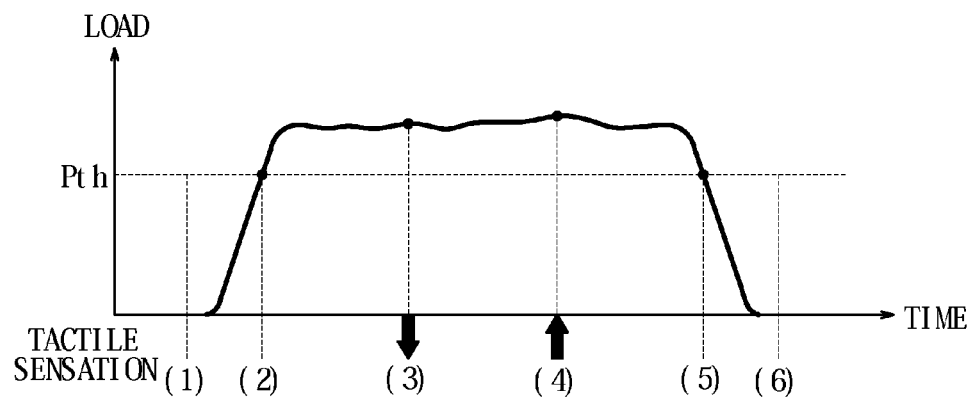

FIG. 10
(A)
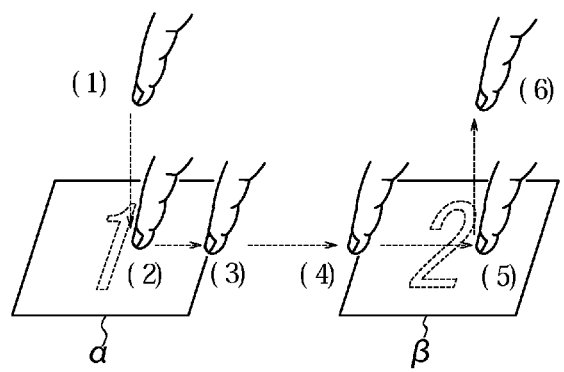
(B)
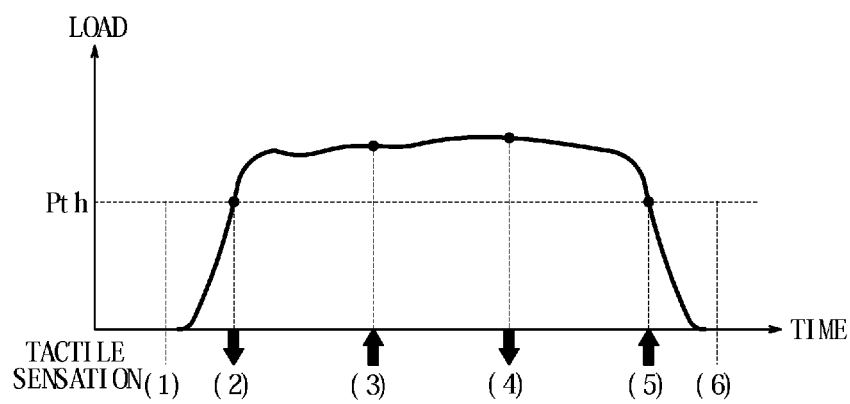

INPUT APPARATUS

CROSS REFERENCE TO RELATED APPLICATION

This application claims priority to and the benefit of Japanese Patent Application No. 2009-197318 filed on Aug. 27, 2009, the entire contents of which are incorporated herein by reference.

TECHNICAL FIELD

The present invention relates to an input apparatus having a touch sensor.

BACKGROUND ART

In recent years, there are mobile terminals such as mobile phones that employ input apparatuses having touch sensors such as touch panels, touch switches, or the like, as input apparatuses such as operation units, switches and the like configured to receive input operations by users. Such input apparatuses having touch sensors are popularly employed not only by the mobile terminals but also by information equipments such as calculators, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of any of these types receive a touch input by a finger or a stylus pen, and, unlike push-button switches, touch sensors themselves are not physically displaced when touched.

Since the touch sensors themselves are not physically displaced when touched, an operator cannot obtain feedback to an input even though the touch input is received. As an operation feeling to "have pressed or have canceled pressing down" is not obtained in operation input, the operator cannot perceive whether the touch sensor detects the operation input. As a result, the operator is likely to repeat inputting the same spot multiple times, which may be stressful for the operator.

In order to prevent such unnecessary repetitive inputs, there are known input apparatuses allowing for visual or auditory confirmation of the input operations by, for example, generating sounds when detecting the touch input or by changing a display state, such as colors of input objects such as input buttons and the like graphically depicted on a display unit, based on an input position.

However, such auditory feedback may be difficult to be confirmed in a noisy environment and is not applicable when the equipment being used is in a silent mode. In addition, in using such visual feedback, if the input object displayed on the display unit is small, the operator may not be able to confirm the change in the display state, as a view of the input object is blocked by a finger, particularly when the operator is inputting by the finger.

In order to deal with such a problem, there is also suggested a feedback method relying on neither the auditory- nor visual sensation but instead generating a tactile sensation at operator's fingertip by vibrating the touch sensor when the touch sensor detects an input (for example, see Patent Documents 1, 2).

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

According to the techniques disclosed in the above Patent Documents 1 and 2, it is possible to provide the tactile sensation by vibration at the operator's fingertip when the operation input to the touch sensor is detected. Therefore, in carrying out an input by means of such an input apparatus, the operator can tactually recognize that the operation input to the touch sensor is detected by the input apparatus.

In addition, application of such technique to the input apparatus enables to provide the tactile sensation only when there is an input to the touch sensor at a position corresponding to the input object such as the input button and the like graphically depicted on the display unit, based on position information from the touch sensor. That is, the input apparatus adopting the technique described above, while displaying the input objects such as keys and buttons on the display unit, is capable of providing the tactile sensation not in response to the touch input to the touch sensor at a position corresponding to no keys but in response to the touch input to the touch sensor at a position corresponding to the key.

The techniques disclosed in the above Patent Documents 1 and 2, however, merely vibrate the touch sensor in response to an input when the touch sensor detects the input. Therefore, especially in using the input apparatus having the button switch such as a mechanical push-button switch (push-type button switch) graphically depicted on the touch sensor, the tactile sensation is provided when the finger or the like lightly contacts (touches) the touch sensor. Since such an input apparatus responds to a light contact (touch) before the operator pushes the touch sensor, it may lead to an erroneous operation. In addition, since such an input operation provides the tactile sensation in response to a light contact (touch) before the operator pushes the touch sensor even if the operator has no intention to push the button switch graphically depicted (even if the operator is not applying a pressure), it provides a feeling of strangeness to the operator.

Incidentally, there is a so-called slide input as an input method which is characteristic in an input mode using the touch sensor. The slide input is an input to move a touch position while maintaining a light contact (touch) to the touch face of the touch sensor, which is similar to an operation to lightly drag the finger or the like on the touch face.

It causes a problem when the input apparatus with the touch sensor adopting conventional schemes described above provides the tactile sensation as it were a sensation obtained when operating the mechanical push-button switch. More specifically, for example, when the touch sensor detects the slide input from a position corresponding to no keys to a position corresponding to the key, this input apparatus considers that the key is pressed down and provides the tactile sensation. Since the tactile sensation is provided even though the operator lightly dragged the fingers or like without pushing the button switch graphically depicted as the object, it results in an operation bringing the feeling of strangeness to the operator.

In operating the mechanical push-button switch, the operator should expect that a tactile sensation of depression of the switch (hereinafter, referred to as a click sensation) is provided when the operator moves a pressing position from a position with no switch to a position with a switch while applying a certain pressure. Similarly, in operating the mechanical push-button switch, the operator expects that another tactile sensation of recovery of the pressed switch to an original unpressed state (hereinafter, referred to as a release sensation) is provided when the operator moves the pressing position from the position with the switch to the position with no switch while applying the certain pressure. Moreover, in operating the mechanical push-button switch, the operator expects that neither the click sensation nor the release sensation is provided when the operator moves the pressing position from the position with no switch to the position with the switch, and vice versa, while applying a very light pressure.

The conventional input apparatuses described above, however, determine whether to provide the tactile sensation based on the position information from the touch sensor in response to the slide input on the touch sensor and uniformly provide the tactile sensation regardless of strength of the pressure of the slide input. Accordingly, even when the operator drags the fingers or the like on the touch sensor applying a very light pressure without an intention to push it, such motion is detected as the slide input. If this slide input is carried out at a position corresponding to the input object, it is considered that the key is pressed down and the tactile sensation is provided. Therefore, the operator has the feeling of strangeness in operation due to the tactile sensation unexpectedly provided. In such a case, moreover, an operation based on the user's unintended input is executed, which imposes an extra operation to cancel the operation or to re-input on the operator.

Accordingly, an object of the present invention in consideration of such conditions is to provide an input apparatus capable of providing, through the touch sensor, the tactile sensation as it were a sensation obtained when operating the key and the like constituted of a mechanical switch.

Solution to Problem

In order to achieve the above object, an input apparatus according to a first aspect of the present invention includes:
a touch sensor configured to detect a contact;
a load detection unit configured to detect a pressure load on a touch face of the touch sensor;
a tactile sensation providing unit configured to vibrate the touch face; and
a control unit configured to control drive of the tactile sensation providing unit, when a position of the contact detected by the touch sensor moves into a predetermined region while the pressure load detected by the load detection unit satisfies a predetermined standard, such that a tactile sensation is provided to an object pressing the touch face.

A second aspect of the present invention is the input apparatus according to the first aspect, wherein the control unit controls drive of the tactile sensation providing unit, when the position of the contact detected by the touch sensor moves out of the predetermined region while the pressure load detected by the load detection unit satisfies the predetermined standard, such that the tactile sensation is provided to the object pressing the touch face.

Effect of the Invention

According to the present invention, when the position of the contact to the touch sensor moves into the predetermined region while the pressure load satisfies the standard load, the tactile sensation is provided to the object pressing the touch face. According to the present invention, therefore, it is possible to provide, through the touch sensor, the tactile sensation as it were a sensation obtained when operating the key and the like constituted of a mechanical switch. Thereby, it is possible for the operator to feel a realistic sensation, such as one obtained when operating a mechanical push-button switch, without a feeling of strangeness. In addition, since an operation based on an unintentional input by the operator is avoided, the burden of re-inputting and the like for the operator is eliminated.

BRIEF DESCRIPTION OF DRAWINGS

FIG. 2 illustrates an exemplary housing structure of the input apparatus according to the embodiment of the present invention;

FIG. 5 illustrates examples of an operation and a pressure load received by the input apparatus according to the embodiment of the present invention;

FIG. 6 illustrates other examples of the operation and the pressure load received by the input apparatus according to the embodiment of the present invention;

FIG. 7 illustrates yet other examples of the operation and the pressure load received by the input apparatus according to the embodiment of the present invention;

FIG. 8 illustrates yet other examples of the operation and the pressure load received by the input apparatus according to the embodiment of the present invention;

FIG. 10 illustrates yet other examples of the operation and the pressure load received by the input apparatus according to the embodiment of the present invention.

DESCRIPTION OF EMBODIMENT

An embodiment of the present invention will be described with reference to the accompanying drawings.

Figure 1:
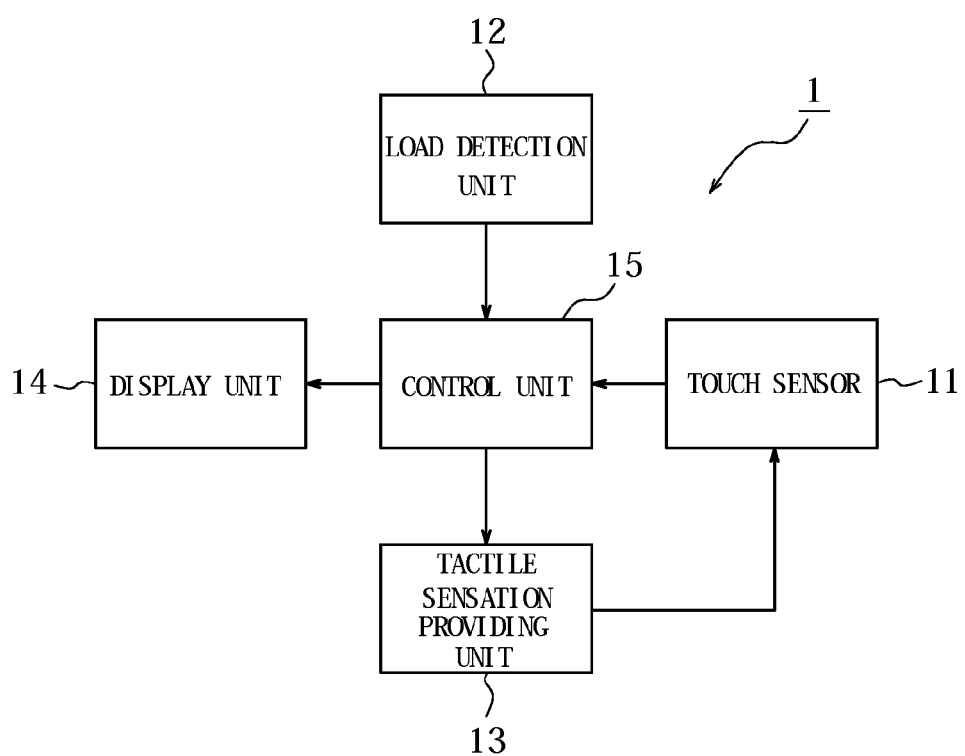
FIG. 1 is a block diagram illustrating a schematic constitution of an input apparatus according to an embodiment of the present invention.

FIG. 1 is a block diagram illustrating a schematic constitution of an input apparatus according to an embodiment of the present invention. According to the present embodiment, any input apparatus is applicable, as long as it receives an operator's touch input by using a touch sensor. Such input apparatuses may be mounted on, for example, mobile terminals used to input characters and numbers, ATM machines at a bank, and ticket vending machines at a train station.

As illustrated in FIG. 1, an input apparatus 1 according to the present embodiment has a touch sensor 11, a load detection unit 12, a tactile sensation providing unit 13, a display unit 14, and a control unit 15 configured to control overall operations.

The touch sensor 11 is usually disposed on a front face of the display unit 14 such that a touch face of the touch sensor 11 detects a pressing input (contact) to a key and a button (hereinafter, referred to simply as a "key and the like") displayed on the display unit 14 by an operator's finger or the like. The touch sensor 11 may be configured, for example, by a known type such as a resistive film type, a capacitive type, an optical type or the like. The load detection unit 12 detects a pressure load applied to the touch face of the touch sensor 11 and may include an element such as, for example, a strain gauge sensor, a piezoelectric element or the like, which linearly reacts to a load. The tactile sensation providing unit 13 vibrates the touch sensor 11 and may include, for example, a piezoelectric vibrator. The display unit 14 displays an input object of an input button and the like such as a push-button switch (push-type button switch) and may include, for example, a liquid crystal display panel, an organic EL display panel or the like.

FIG. 2 illustrates an exemplary housing structure of the input apparatus 1 illustrated in FIG. 1; FIG. 2(a) is a cross-sectional view of a main section, and FIG. 2(b) is a plane view of the main section. The display unit 14 is contained in a housing 21. The touch sensor 11 is disposed on the display unit 14 via insulators 22 made of elastic members. In the input apparatus 1 according to the present embodiment, the display unit 14 and the touch sensor 11 are rectangular in shape in a planar view. Also, according to the present embodiment, the touch sensor 11 is held on the display unit 14 via the insulators 22 arranged at four corners outside a display area A of the display unit 14 illustrated by a chain double-dashed line in FIG. 2(b).

The housing 21 is provided with an upper cover 23 covering a surface area of the touch sensor 11 outside the display area of the display unit 14. An insulator 24 made of elastic member is arranged between the upper cover 23 and the touch sensor 11.

The touch sensor 11 illustrated in FIG. 2 may have, for example, a surface member having a touch face 11a and constituted of a transparent film or the glass, and a rear face member constituted of the glass or acryl. The touch sensor 11 is designed such that, when the touch face 11a is pressed down, a pushed part is bent (strained) slightly in accordance with the pressing force or a structure itself is bent slightly.

A strain gauge sensor 31 to detect the load (pressuring force) applied on the touch sensor 11 is provided, adhered or the like, on a surface of the touch sensor 11 at a position close to each periphery to be covered by the upper cover 23. In addition, a piezoelectric vibrator 32 to vibrate the touch sensor 11 is provided, adhered or the like, on the rear face of the touch sensor 11 at a position close to a periphery on each of two opposing sides. That is, the input apparatus illustrated in FIG. 2 has the load detection unit 12 illustrated in FIG. 1 including four strain gauge sensors 31 and the tactile sensation providing unit 13 including two piezoelectric vibrators 32. In addition, the tactile sensation providing unit 13 vibrates the touch sensor 11 such that the touch face 11a is vibrated. It is to be noted that the housing 21, the upper cover 23 and the insulator 24 illustrated in FIG. 2(a) are omitted in FIG. 2(b).

Figure 3:
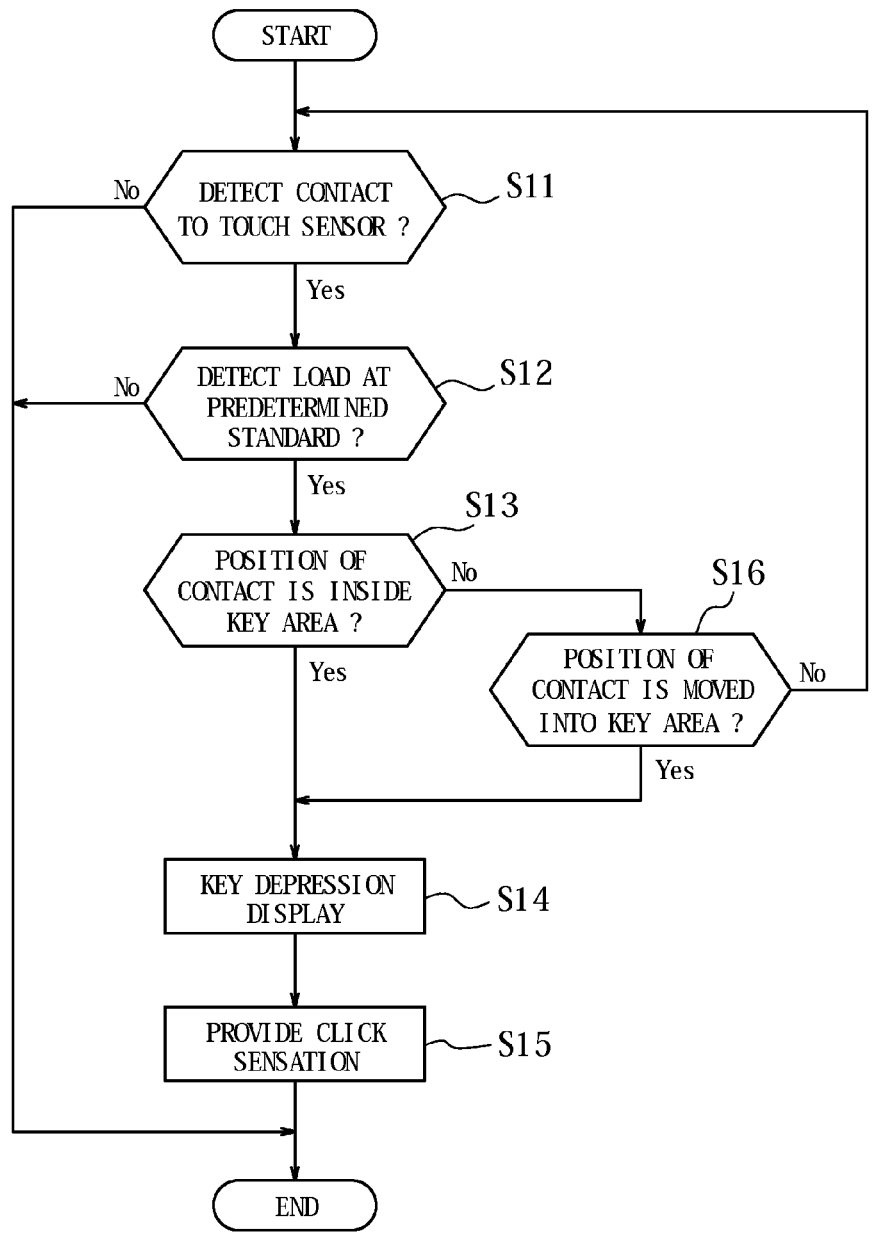
FIG. 3 is a flowchart illustrating an operation by the input apparatus according to the embodiment of the present invention when a position of a contact moves into a key region.
Figure 4:
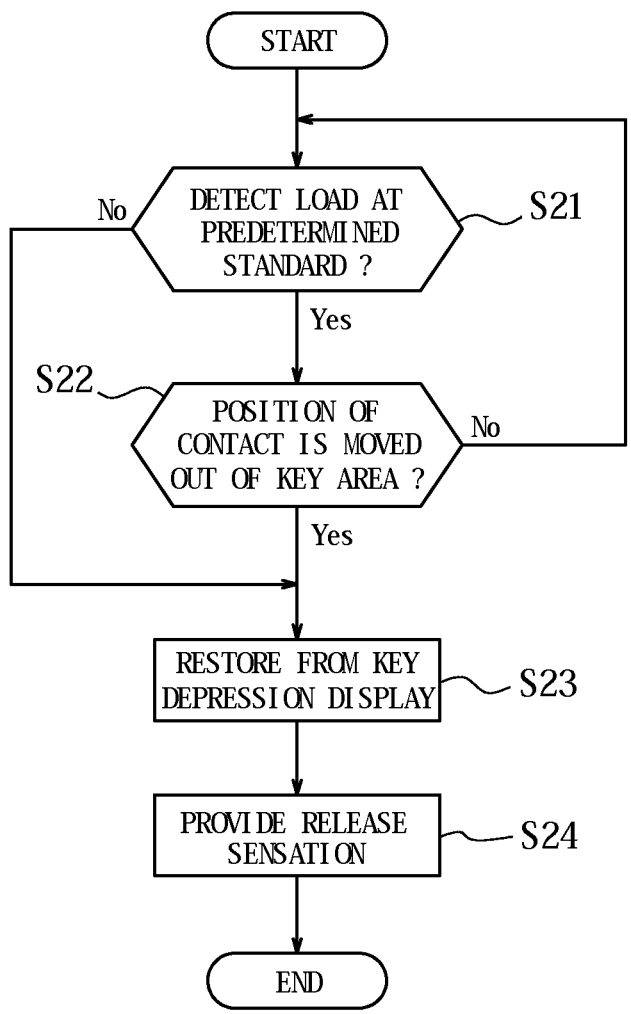
FIG. 4 is a flowchart illustrating an operation by the input apparatus according to the embodiment of the present invention when the position of the contact moves out of the key region.

FIG. 3 and FIG. 4 are flowcharts illustrating operations of the input apparatus 1 according to the present embodiment. The input apparatus 1 according to the present embodiment provides a tactile sensation when a position of a contact detected by the touch sensor 11 moves into a region corresponding to an input object while the pressure load satisfies a predetermined standard.

The flowchart in FIG. 3 illustrates an operation to provide the tactile sensation when, after the input apparatus 1 detects a contact, the contact corresponds to key and the like or when a position of the contact moves into a position corresponding to the key and the like. In order to start the operation illustrated in the flowchart in FIG. 3, the input objects such as the key and the like are displayed on the display unit 14 of the input apparatus 1 before receiving a contact to the touch face of the touch sensor 11. According to the present embodiment, the input object may be a graphical image suggesting a region to receive the contact to the operator. For example, an image graphically depicting numbers and characters on key tops, as the graphical images of the input objects, is displayed on the display unit 14.

When the input apparatus 1 according to the present embodiment starts the operation, the control unit 15 monitors a contact detected by the touch sensor 11 and a load detected by the load detection unit 12. At step S11, when the touch sensor 11 detects a contact by a pressing object (pressing means), such as the operator's finger, a stylus pen or the like, the control unit 15 proceeds to step S12.

At step S12, the control unit 15 determines whether the pressure load detected by the load detection unit 12 is increased by a pressure on the touch sensor 11 and satisfies a predetermined standard. The load detection unit 12 detects the load from, for example, an average output value of the four strain gauge sensors 31. Here, it is preferable that, based on the pressure load of a usual pressing operation by the operator, the Pth is preset to be, for example, 1 N (Newton) and resettable thereafter. In addition, it is avoided to set the predetermined standard too low in consideration of the pressure load of the pressing input intended by the operator (for example, an average value of the pressure loads), in order to avoid receiving an inadvertent contact operation when the operator lightly touches the touch sensor 11 and also in order to provide the operator with a pressure sensation for a realistic tactile sensation described below. Even though the touch sensor 11 detects a contact at step S11, the operation according to the present embodiment is not performed if the pressure load detected by the load detection unit 12 does not satisfy the predetermined standard at step S12.

When the pressure load satisfying the predetermined standard is detected at step S12, the control unit 15 determines whether a position of the contact detected by the touch sensor 11 is inside the predetermined region (step S13). According to the present embodiment, the "predetermined region" is an area of the touch sensor 11 corresponding to a position of the display unit 14 displaying the input object such as the keys and the buttons to receive an input. Since the "predetermined region" corresponds to the key and the like, it is referred to simply as a "key region" appropriately in the following description.

If the position of the contact is inside the key region at step S13, the control unit 15 changes a display state of the input object corresponding to the position of the contact detected on the display unit 14 (step S14). Such change of the display state of the input object at step S14 may be, for example, changing a state of the graphically depicted object such that it looks like a key depression when a mechanical push-button switch is pressed down by the operator (hereinafter, referred to as a "depression display" of the key). Alternatively, it is also possible to change the display state of the input object by momentarily changing color or brightness of the input object, in order to clearly notify reception of the pressing input by the operator.

After the depression display of the key at step S14, the control unit 15 drives the tactile sensation providing unit 13 with a predetermined drive signal such that the touch sensor 11 is vibrated in a predetermined vibration pattern and provides the tactile sensation (step S15). The tactile sensation providing unit 13 drives, for example, two piezoelectric vibrators 32 in phase. As described above, the input apparatus 1 receives the pressing input by a pushing operation based on an operator's intention.

On the other hand, if the position of the contact is outside the key region at step S13, the control unit 15 determines whether the position of the contact detected by the touch sensor 11 has moved into the key region (step S16). In this case, that is, the control unit 15 determines whether the position of the contact has moved into the key region from outside the key region while the pressure load satisfies the predetermined standard. From a point of view of an operation carried out by the operator, it corresponds to an operator's motion to move (slide) the position of the contact from a position not corresponding to the input object such as the key and the like to a position corresponding thereto on the touch sensor 11 while applying the pressure load satisfying the predetermined standard to the touch sensor 11.

When the position of the contact has not moved into the key region at step S16, the control unit 15 returns to step S11 and determines whether the touch sensor 11 is still detecting the contact. If the touch sensor 11 does not detect the contact any longer, it may be considered that the operator has removed the finger or the like from the touch sensor 11. Therefore, the operation according to the present embodiment ends. If the touch sensor 11 is still detecting the contact, the control unit 15 performs the operation from step S12 described above.

On the other hand, if the position of the contact moves into the key region at step S16, the control unit 1 15 changes the display state of the input object corresponding to the position of the contact detected (step S14) and provides the tactile sensation (step S15). Here, when the position of the contact detected by the touch sensor 11 moves into the predetermined region while the pressure load detected by the load detection unit 12 satisfies the predetermined standard, the control unit 15 controls drive of the tactile sensation providing unit 13 such that the tactile sensation is provided to the pressing object pressing the touch face.

Preferably, the tactile sensation provided to the pressing object by the tactile sensation providing unit 13 at step S15 is the click sensation described above. In order to provide a realistic click sensation to the operator, the input apparatus 1 stimulates a tactile sensation of the operator while stimulating a pressure sensation, by the following operation. That is, the input apparatus 1 stimulates the pressure sensation until the pressure load applied to the touch sensor 11 satisfies the standard to provide the tactile sensation (for example, 1N) and, when the pressure load satisfies the standard, stimulates the tactile sensation by driving the piezoelectric element 32 with the predetermined drive signal such that the touch face 11a is vibrated. Thereby, the input apparatus 1 can provide the operator with the click sensation similar to that obtained when pressing the button switch such as the push-button switch (push-type button switch). Accordingly, even with the push-button switch graphically depicted on the touch sensor, the operator can carry out an input operation feeling the realistic click sensation similar to that obtained when operating the actual push-button switch. Therefore, the operator would not have a feeling of strangeness. Moreover, since the operator can carry out the input operation in conjunction with a perception to "have tapped" the touch sensor 11, erroneous inputs caused by mere tapping is prevented.

The drive signal to provide the click sensation described above, that is, a certain frequency, a period (wavelength), a waveform and a vibration amplitude to stimulate the tactile sensor may be set suitably according to the click sensation to be provided. For example, in order to provide the click sensation represented by a metal dome switch employed by the mobile terminal, the tactile sensation providing unit 13 is driven by the drive signal of, for example, a sine wave with a frequency of 170 Hz, for 1 period. The tactile sensation providing unit 13 is driven with the drive signal described above such that the touch face 11a is vibrated by approximately 15 μm under the standard pressure load Pth. Thereby, it is possible to provide the operator with the realistic click sensation similar to that obtained when pressing down an actual key.

FIG. 4 is a flowchart illustrating an operation subsequent to the operation illustrated in FIG. 3. Since the flowchart illustrated in FIG. 4 is a sequel to the operation in FIG. 3, it starts in a state that the touch sensor 11 detects the contact of the position corresponding to the input object displayed on the display unit 14 while the load detection unit 12 detects the pressure load satisfying the predetermined standard. That is, at start of the operation illustrated in FIG. 4, the position of the contact is already in the key region and, simultaneously, the pressure load satisfies the predetermined standard. The flowchart illustrated in FIG. 4 is the operation performed when the position of the contact in the key region moves out of the key region.

When the operation of the input apparatus 1 illustrated by the flowchart in FIG. 4 is started, the control unit 15 first determines whether the pressure load detected by the load detection unit 12 is still satisfying the predetermined standard (step S21).

When it is determined that the pressure load is no longer satisfying the predetermined standard at step S21, the control unit 15 changes the display state of the input object from the depression display to an original display therebefore and displays the input object on the display unit 14 (step S23). In restoring the display state of the input object at step S23, it may be considered to change the graphical image of the object from the depression display displayed at step S14 in FIG. 3 to a display representing recovery of the key from depression when pressure on the mechanical push-button switch is released. In this case also, in order to clearly notify that it has stopped receiving the pressing input by the operator, that is, the pressing input is canceled, it is possible to display the display state such as momentarily changes the color or the brightness of the input object.

After restoring the display state of the key from the depression display at step S23, the control unit 15 drives the tactile sensation providing unit 13 with the predetermined drive signal such that the touch sensor 11 is vibrated in the predetermined vibration pattern and provides the tactile sensation (step S24).

On the other hand, when it is determined that the pressure load is still satisfying the predetermined standard at step S21, the control unit 15 determines whether the position of the contact detected by the touch sensor 11 has moved out of the key region (step S22). That is, in this case, the control unit 15 determines whether the position of the contact moves from inside the key region to outside the key region while the pressure load satisfies the predetermined standard. From a point of view of an operation carried out by the operator, it corresponds to an operator's motion to move (slide) the position of the contact from the position corresponding to the input object such as the key and the like to the position not corresponding thereto on the touch sensor 11 while applying the pressure load satisfying the predetermined standard to the touch sensor 11.

When the position of the contact has not moved out of the key region at step S22, the control unit 15 returns to step S21 and determines whether the touch sensor 11 is still detecting the contact. When it is determined that the pressure load is no longer satisfying the predetermined standard at step S21, the control unit 15 performs operations at step S23 and step S24.

On the other hand, when the position of the contact moves out of the key region at step S22, the control unit 15 restores the display state of the input object from the depression display to the original display (step S23) and drives the tactile sensation providing unit 13 with the predetermined drive signal and provides the tactile sensation (step S24). Here, that is, when the position of the contact detected by the touch sensor 11 moves out of the predetermined region while the pressure load detected by the load detection unit 12 satisfies the predetermined standard, the control unit 15 drives the tactile sensation providing unit 13 such that the tactile sensation is provided to the pressing object pressing the touch face.

Preferably, the tactile sensation provided to the pressing object by the tactile sensation providing unit 13 at step S24 is the release sensation described above. The drive signal to drive the tactile sensation providing unit 13 to provide the release sensation may be either the same as, or different from, the drive signal (for click sensation) in pressing at step S15 in FIG. 3. For example, the frequency of the drive signal (for click sensation) to provide the tactile sensation at step S15 may be at 170 Hz, while the drive signal in releasing may be at 125 Hz. Thereby, it is possible to provide the operator with the realistic release sensation, different from the click sensation, obtained when releasing the actual key. As stated above, it is possible to provide the release sensation in releasing after the click sensation by pressing is provided, as a counterpart of the click sensation, by driving the tactile sensation providing unit 13 with the predetermined drive signal and vibrating the touch sensor 11 in the predetermined vibration pattern in the same manner as that in pressing. Accordingly, in combination with the click sensation in pressing, it is possible to provide the operator with the click sensation more similar to that of the pushbutton switch.

With reference to FIG. 5 to FIG. 10, an example of the operation by the input apparatus 1 according to the present embodiment described with reference to FIG. 3 and FIG. 4 will be described below. FIG. 5 is a diagram illustrating examples of the operation and the pressure load to receive the pressing input by the input apparatus 1 according to the embodiment of the present invention.

FIG. 5(A) is a diagram schematically illustrating a state that the operator's finger presses inside a key region α and then the pressure is released. In FIG. 5(A), the key region α is an area of the touch sensor 11 and corresponds to a position displaying the input object, such as the key and button, to receive an input on the display unit 14. In FIG. 5(A), characters such as "A" and "1" responsible for inputs and usually displayed on key tops of the input objects are omitted. In addition, a proportion of the key region α and the operator's finger does not reflect an actual proportion but employed for convenience sake.

FIG. 5(B) is a graph illustrating a chronological change in the pressure load on the touch face of the touch sensor 11 detected by the load detection unit 12 during the operation illustrated in FIG. 5(A). In FIG. 5(B), the "predetermined standard" of the pressure load set forth above is represented by Pth. In addition, bracketed numbers represent an order of elapsed time. In the following description, the bracketed numbers are referred to as "points" for the sake of explanation.

As illustrated in FIG. 5(A), a point (1) represents a state that the operator is about to press inside the key region α, a point (2) represents a state that the operator is pressing inside the key region α while applying the pressure load satisfying the predetermined standard, and a point (3) represents a state that the operator is releasing the pressure. In such an operation, as illustrated in FIG. 5(B), the load detection unit 12 starts detecting the pressure load (that is, the operator starts pressing the touch face) between the point (1) and the point (2), and then stops detecting the pressure load (that is, the operator releases the pressure on the touch face) between the point (2) and the point (3). At the point (2), in addition, the load detection unit 12 detects the pressure load satisfying the predetermined standard Pth. The pressure load satisfies the Pth slightly before the point (2) and stops satisfying the Pth slightly after the point (2).

As described with reference to FIG. 3) and FIG. 4), the input apparatus 1 according to the present embodiment provides the click sensation when detecting the pressure load satisfying the predetermined standard Pth in the key region α and the release sensation when detecting that the pressure load stops satisfying the predetermined standard Pth in the key are α. In FIG. 5(B), a downward pointing arrow illustrated under a time axis when the pressure load satisfies the Pth slightly before the point (2) indicates when the click sensation, which is a key depression sensation, is provided. Similarly, an upward pointing arrow illustrated under the time axis when the pressure load stops satisfying the Pth slightly after the point (2) indicates when the release sensation, a recovery sensation of key depression, is provided.

According to the present embodiment, the click sensation is provided when detecting the pressure load satisfying the predetermined standard Pth in the key region and the release sensation when the pressure load stops satisfying the predetermined standard Pth in the key region. That is, an example is above described, such that the standard of the pressure load to provide the click sensation and that to provide the release sensation have the same value Pth. However, it is also possible to set the standard of the pressure load to provide the release sensation to be 50-80% lower than that to provide the tactile sensation in pressing. Thereby, when the operator clicks and then releases the pressure at the same position (input object), a sequential operation to press and release the pressure and timings to provide the tactile sensations become in synchronization with one another spontaneously, providing realistic click sensation and release sensation without the feeling of strangeness.

As described above, when the pressure load on the touch face detected satisfies the predetermined standard Pth (step S12) and the position of the contact is inside the key region α (step S13), the input apparatus 1 provides the click sensation (step S15). Similarly, even though the position of the contact is inside the key region α (START in FIG. 4), when the pressure load detected on the touch face stops satisfying the predetermined standard Pth (step S21), the release sensation is provided (step S24).

According to the input apparatus 1 of the embodiment of the present invention, as described above, the operator can obtain the click sensation when pressing the key region α while applying the pressure load satisfying the predetermined standard Pth and then obtains the release sensation when reducing the pressure load to stop satisfying the predetermined standard Pth. Thereby, the operator can obtain the tactile sensation as it were a sensation obtained when operating the key and the like constituted of a mechanical switch.

FIG. 6 is a diagram illustrating other examples of the operation and the pressure load to receive the pressure input by the input apparatus 1 according to the embodiment of the present invention. In FIG. 6 and thereafter, each symbol and the like has the same meaning as that described with reference to FIG. 5. FIG. 6(A) is a diagram schematically illustrating a state that the operator's finger presses inside the key region α and then moves out it while the pressure load is maintained, and then the pressure is released.

As illustrated in FIG. 6(A), the point (1) represents a state that the operator is about to press the key region α and the point (2) represents a state that the operator is pressing inside the key region α while applying the pressure load satisfying the predetermined standard. The point (3) represents a state that, from the point (2), the operator is moving the position of the contact within the key region α and out therefrom while applying the pressure load satisfying the predetermined standard. A point (4) represents a state that, from the point (3), the operator is moving the position of the contact outside the key region α while applying the pressure load satisfying the predetermined standard. A point (5) represents a state that the operator is releasing the pressure.

In this operation, as illustrated in FIG. 6(B), the load detection unit 12 starts detecting the pressure load (that is, the operator starts pressing the touch face) between the point (1) and the point (2). At the point (2), the load detection unit 12 detects the pressure load satisfying the predetermined standard Pth. Between the point (2) and the point (3), the pressure load continuously satisfies the predetermined standard Pth (that is, the operator is moving the position of the contact while applying the pressure load satisfying the Pth). Between the point (3) and the point (4) also, the load detection unit 12 continuously detects the pressure load satisfying the predetermined standard Pth (that is, the operator is moving the position of the contact while applying the pressure load satisfying the Pth). At the point (4), the pressure load stops satisfying the Pth. Then, between the point (4) and the point (5), the load detection unit 12 stops detecting the pressure load (that is, the operator releases the pressure on the touch face).

As described with reference to FIG. 3 and FIG. 4, the input apparatus 1 according to the present embodiment provides the click sensation when detecting the pressure load satisfying the predetermined standard Pth in the key region α and the release sensation when the position of the contact moves out of the key region α while the pressure load satisfies the predetermined standard Pth.

As illustrated in FIG. 6(B), the downward pointing arrow illustrated under the time axis when the pressure load satisfies the Pth at the point (2) indicates when the click sensation is provided. Similarly, the upward pointing arrow illustrated under the time axis at the point (3) indicates when the release sensation is provided. Although the pressure load stops satisfying the Pth at the point (4), neither a condition to provide the click sensation nor that to provide the release sensation is not satisfied. Therefore, the input apparatus 1 does not provide the tactile sensation at this point.

As described above, when the pressure load on the touch face detected satisfies the predetermined standard Pth (step S12) and the position of the contact is inside the key are a (step S13), the input apparatus 1 provides the click sensation (step S15). On the other hand, when the pressure load continuously satisfies the predetermined standard Pth (step S21) while the position of the contact moves out of the key region α (step S22), the input apparatus 1 provides the release sensation (step S24).

According to the input apparatus 1 of the present embodiment, as described above, the operator can obtain the click sensation when pressing the key region α while applying the pressure load satisfying the predetermined standard Pth and the release sensation when moving the position of the contact out of the key region α while maintaining the pressure load satisfying the predetermined standard Pth. Thereby, in using the touch sensor, when the operator inputs by moving the position of the contact, the operator can obtain the tactile sensation as it were the sensation obtained when operating the key and the like constituted of the mechanical switch.

FIG. 7 is a diagram illustrating yet other examples of the operation and the pressure load to receive the pressure input by the input apparatus 1 according to the embodiment of the present invention. FIG. 7(A) is a diagram schematically illustrating a state that the operator's finger presses outside the key region α, moves into the key region α while maintaining the pressure, and then the pressure is released.

As illustrated in FIG. 7(A), the point (1) represents the state that the operator is about to press outside the key region α and the point (2) represents the state that the operator is pressing outside the key region α while applying the pressure load satisfying the predetermined standard. The point (3) represents a state that, from the point (2), the operator is moving the position of the contact outside of the key region α and thereinto while applying the pressure load satisfying the predetermined standard. The point (4) represents a state that, from the point (3), the operator is moving the position of the contact within the key region α while applying the pressure load satisfying the predetermined standard. The point (5) represents a state that the operator is releasing the pressure.

In this operation, as illustrated in FIG. 7(B), the load detection unit 12 starts detecting the pressure load (that is, the operator starts pressing the touch face) between the point (1) and the point (2). At the point (2), in addition, the load detection unit 12 detects the pressure load satisfying the predetermined standard Pth. Between the point (2) and the point (3), the pressure load continuously satisfies the predetermined standard Pth (that is, the operator moves the position of the contact while applying the pressure load satisfying the Pth). Between the point (3) and the point (4) also, the load detection unit 12 continuously detects the pressure load satisfying the predetermined standard Pth (that is, the operator moves the position of the contact while applying the pressure load satisfying the Pth). At the point (4), the pressure load stops satisfying the Pth. Moreover, the load detection unit 12 stops detecting the pressure load (that is, the operator releases the pressure on the touch face) between the point (4) and the point (5).

As described with reference to FIG. 3 and FIG. 4, the input apparatus 1 according to the present embodiment provides the click sensation when the position of the contact moves into the key region α while the pressure load satisfies the predetermined standard Pth and the release sensation when the pressure load in the key region α detected stops satisfying the predetermined standard Pth.

As illustrated in FIG. 7(B), the downward pointing arrow illustrated under the time axis at the point (3) indicates when the click sensation is provided. Similarly, the upward pointing arrow illustrated under the time axis at the point (4) when the pressure load stops satisfying the Pth indicates when the release sensation is provided. Although the pressure load satisfies the Pth at the point (2) (step S12), the position of the contact is outside the key region α (step S13) and has not moved into the key region α (step S16), neither the condition to provide the click sensation nor that to provide the release sensation is not satisfied. Therefore, the input apparatus 1 does not provide the tactile sensation at this point.

As described above, when the pressure load satisfies the predetermined Pth (step S12) while the position of the contact moves from outside the key region α thereinto (step S16), the input apparatus 1 provides the click sensation (step S15). On the other hand, even if the position of the contact is inside the key region α (START in FIG. 4), when the pressure load on the touch face detected stops satisfying the predetermined standard Pth (step S21), the input apparatus 1 provides the release sensation (step S24).

According to the input apparatus 1 of the present embodiment, as described above, it is possible for the operator to obtain the click sensation when moving the position of the contact into the key region α while maintaining the pressure load satisfying the predetermined standard Pth and the release sensation when reducing the pressure load on the key region α to stop satisfying the predetermined standard Pth.

FIG. 8 is a diagram illustrating yet other examples of the operation and the pressure load to receive the pressure input by the input apparatus 1 according to the embodiment of the present invention. FIG. 8(A) is a diagram schematically illustrating a state that the operator's finger presses outside the key region α, moves into the key region α and out of the key region α while maintaining the pressure, and then the pressure is released.

As illustrated in FIG. 8(A), the point (1) represents the state that the operator is about to press outside the key region α and the point (2) represents the state that the operator is pressing outside the key region α while applying the pressure load satisfying the predetermined standard. The point (3) represents a state that, from the point (2), the operator is moving the position of the contact outside the key region α and thereinto while applying the pressure load satisfying the predetermined standard. The point (4) represents a state that, from the point (3), the operator is moving the position of the contact inside of the key region α and thereout while applying the pressure load satisfying the predetermined standard. The point (5) represents a state that, from the point (4), the operator is moving the position of the contact outside the key are a while applying the pressure load satisfying the predetermined standard. The point (6) represents a state that the operator is releasing the pressure.

In this operation, as illustrated in FIG. 8(B), the load detection unit 12 starts detecting the pressure load (that is, the operator starts pressing the touch face) between the point (1) and the point (2). At the point (2), in addition, the load detection unit 12 detects the pressure load satisfying the predetermined standard Pth. Between the point (2) and the point (3), the pressure load continuously satisfies the predetermined standard Pth (that is, the operator moves the position of the contact while applying the pressure load satisfying the Pth). Between the point (3) and the point (4) and also between the point (4) and the point (5), the load detection unit 12 continuously detects the pressure load satisfying the predetermined standard Pth (that is, the operator moves the position of the contact while applying the pressure load satisfying the Pth). At the point (5), the pressure load stops satisfying the Pth. Moreover, the load detection unit 12 stops detecting the pressure load (that is, the operator releases the pressure on the touch face) between the point (5) and the point (6).

As described with reference to FIG. 3 and FIG. 4, the input apparatus 1 according to the present embodiment provides the click sensation when the position of the contact moves into the key region α while the pressure load satisfies the predetermined standard Pth. In addition, the input apparatus 1 provides the release sensation when the position of the contact moves out of the key region α while the pressure load satisfies the predetermined standard Pth.

As illustrated in FIG. 8(B), the downward pointing arrow illustrated under the time axis at the point (3) indicates when the click sensation is provided. Similarly, the upward pointing arrow illustrated under the time axis at the point (4) indicates when the release sensation is provided. Although the pressure load satisfies the Pth at the point (2) (step S12), since the position of the contact is outside the key region α (step S13) and has not moved into the key region α (step S16), neither the condition to provide the click sensation nor that to provide the release sensation is not satisfied. Therefore, the input apparatus 1 does not provide the tactile sensation at this point. In addition, although the pressure load stops satisfying the Pth at the point (5), neither the condition to provide the click sensation nor that to provide the release sensation is not satisfied. Therefore, the input apparatus 1 does not provide the tactile sensation at this point.

As described above, when the pressure load satisfies the predetermined Pth (step S12) while the position of the contact moves into the key region α (step S16), the input apparatus 1 provides the click sensation (step S15). On the other hand, when the pressure load satisfies the predetermined standard Pth (step S21) while the position of the contact moves out of the key region α (step S22), the input apparatus 1 provides the release sensation (step S24).

According to the input apparatus 1 of the present embodiment, as described above, the operator can obtain the click sensation when moving the position of the contact into the key region α while maintaining the pressure load satisfying the predetermined standard Pth and then the release sensation when moving the position of the contact out of the key region α while maintaining the pressure load satisfying the predetermined standard Pth.

Figure 9:
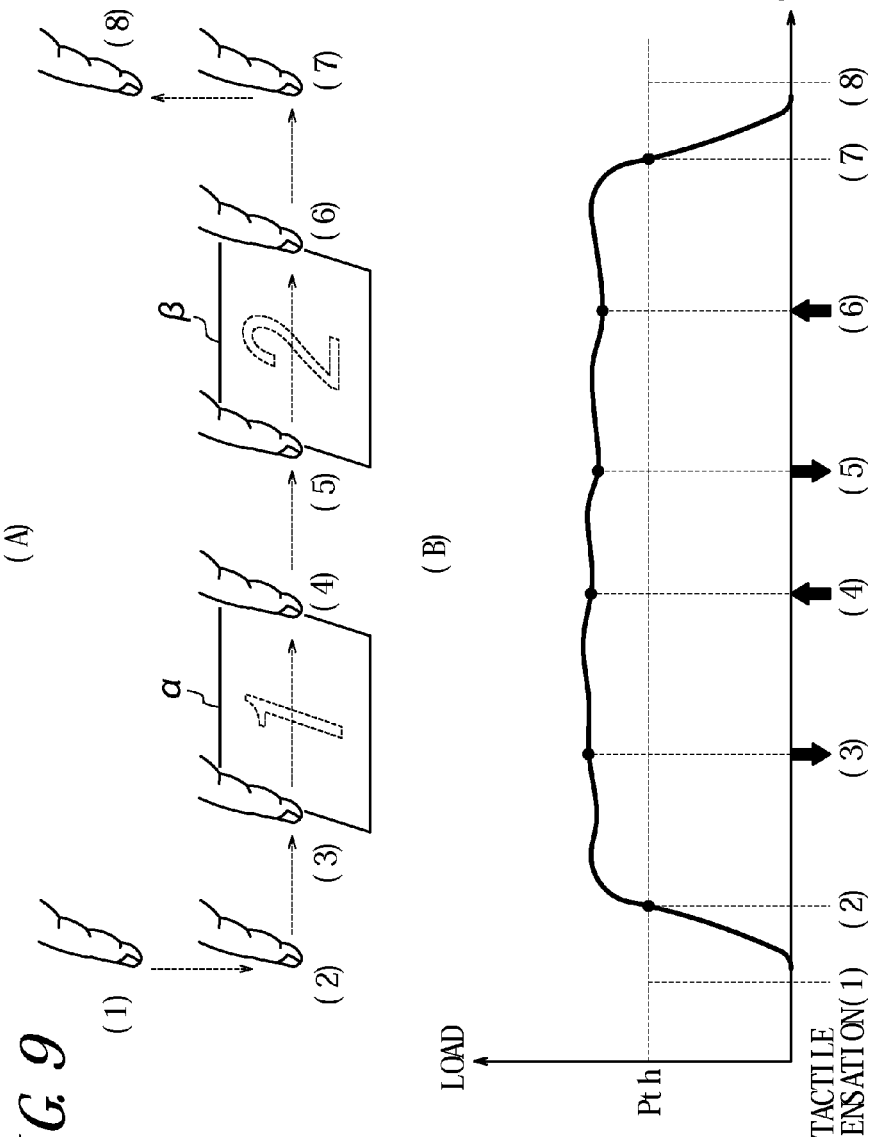
FIG. 9 illustrates yet other examples of the operation and the pressure load received by the input apparatus according to the embodiment of the present invention.

FIG. 9 is a diagram illustrating yet other examples of the operation and the pressure load to receive the pressure input by the input apparatus 1 according to the embodiment of the present invention. FIG. 9(A) is a diagram schematically illustrating a state that the operator's finger presses outside the key region α, moves into the key region α and then out of the key region α while maintaining the pressure, moves into a key region β and then out of the key region β while maintaining the pressure, and releases the pressure. Even when the position of the contact moves across a plurality of different key regions, the input apparatus 1 performs the same operation as described above.

As illustrated in FIG. 9(A), the point (1) represents the state that the operator is about to press outside the key region α and the point (2) represents the state that the operator is pressing outside the key region α while applying the pressure load satisfying the predetermined standard. The point (3) represents a state that, from the point (2), the operator is moving the position of the contact outside the key region α and thereinto while applying the pressure load satisfying the predetermined standard. The point (4) represents a state that, from the point (3), the operator is moving the position of the contact inside the key region α and thereout while applying the pressure load satisfying the predetermined standard.

In addition, the point (5) represents a state that, from the point (4), the operator is moving the position of the contact into the key region β from outside the key region α or β while applying the pressure load satisfying the predetermined standard. The point (6) represents a state that, from the point (5), the operator is moving the position of the contact inside the key region β and thereout while applying the pressure load satisfying the predetermined standard. The point (7) represents a state that, from the point (6), the operator is moving the position of the contact outside the key region β while applying the pressure load satisfying the predetermined standard. The point (8) represents the state that the operator is releasing the pressure.

Based on this operation, as illustrated in FIG. 9(B), the input apparatus 1 provides the click sensation at the point (3) and the release sensation at the point (4). Further, the input apparatus 1 provides the click sensation again at the point (5) and the release sensation again at the point (6). At the point (2), although the pressure load satisfies the Pth, the input apparatus 1 does not provide the tactile sensation. At the point (7), in addition, although the pressure load stops satisfying the Pth, the input apparatus 1 does not provide the tactile sensation.

According to the input apparatus 1 of the present embodiment, as described above, the operator can obtain the click sensation when moving the position of the contact into the key region α or the key region β while maintaining the pressure load satisfying the predetermined standard Pth. According to the input apparatus 1, in addition, the operator can obtain the release sensation when moving the position of the contact out of the key region α or the key region β while maintaining the pressure load satisfying the predetermined standard Pth. Thereby, in using the touch sensor, when the operator inputs by moving the position of the contact across a plurality of key regions, the operator can obtain the tactile sensation as it were the sensation obtained when operating the key and the like constituted of the mechanical switch.

FIG. 10 is a diagram illustrating yet other examples of the operation and the pressure load to receive the pressure input by the input apparatus 1 according to the embodiment of the present invention. FIG. 10(A) is a diagram schematically illustrating a state that the operator's finger presses inside the key region α, moves out of the key region α and into the key region β while maintaining the pressure, and then the pressure is released. Even when the position of the contact moves between a plurality of different key regions, the input apparatus 1 performs the same operation as described above.

As illustrated in FIG. 10(A), the point (1) represents the state that the operator is about to press inside the key region α and the point (2) represents the state that the operator is pressing inside the key region α while applying the pressure load satisfying the predetermined standard. The point (3) represents a state that, from the point (2), the operator is moving the position of the contact inside the key region α and thereout while applying the pressure load satisfying the predetermined standard. The point (4) represents a state that, from the point (3), the operator is moving the position of the contact outside the key regions α or β and into the key region β, while applying pressure load satisfying the predetermined standard. In addition, the point (5) represents a state that, from the point (4), the operator is moving the position of the contact within the key region β while applying the pressure load satisfying the predetermined standard. The point (6) represents the state that the operator is releasing the pressure.

Based on the operation described above, as illustrated in FIG. 10(B), the input apparatus 1 provides the click sensation at the point (2) and the release sensation at the point (3). Further, the input apparatus 1 provides the click sensation again at the point (4) and the release sensation again at the point (5).

According to the input apparatus 1 of the present embodiment, as described above, the operator can obtain the click sensation when pressing inside the key region α or the key region β while applying the pressure load satisfying the predetermined standard Pth and the release sensation when reducing the pressure load inside the key region α or the key region β such that the pressure load stops satisfying the predetermined standard Pth. According to the input apparatus 1, in addition, the operator can obtain the click sensation when moving the position of the contact into the key region α or the key region β while applying the pressure load satisfying the predetermined standard Pth. According to the input apparatus 1, moreover, the operator can obtain the release sensation when moving the position of the contact out of the key region α or the key region β while applying the pressure load satisfying the predetermined standard Pth.

It is to be understood that the present invention is not limited to the above embodiment but may be modified or varied in a multiple of manners. For example, although there is no mention about whether to generate a sound in performing the operation in the embodiment set forth above, it is possible to appropriately generate a sound in conjunction with the operation in addition to the operation in each of the above embodiments. Thereby, it facilitates operator's recognition, further improving operability of the input apparatus and reducing generation of erroneous inputs. In addition, although the touch face of the touch sensor has one or two key regions for the sake of simplification in the embodiment set forth above, it is appreciated that three or more key regions can be provided. In the embodiment set forth above, moreover, in inputting the operator moves the position of the contact in a crosswise direction for the sake of simplification. However, it is appreciated that it is also possible to move the position of the contact in any directions including a longitude direction.

In addition, the load detection unit in the above embodiment may be constituted by using any number of strain gauge sensors. Moreover, the load detection unit may be constituted according to a contact detection scheme of the touch sensor. For example, the load detection unit can be constituted without using the strain gauge sensor if the load can be detected from a change of an output signal based on a resistance change in accordance with a contact region in using the resistive film type. Alternatively, the load detection unit can be constituted without using the strain gauge sensor if the load can be detected from a change in an output signal based on a change in capacitance in using the capacitive type.

In addition, the tactile sensation providing unit may be constituted by using any number of piezoelectric transducers, transparent piezoelectric elements provided on an entire operation surface of the touch sensor or, if it is possible to vibrate such that the tactile sensation is provided, an eccentric motor which rotates 360 degrees in 1 cycle of the drive signal. Moreover, it is possible to configure the load detection unit and the tactile sensation providing unit by using the piezoelectric elements, which allows for a configuration to combine a function unit of the load detection unit and that of the tactile sensation providing unit.

According to the input apparatus of the present invention, the tactile sensation providing unit is driven when the pressure load detected by the load detection unit satisfies the predetermined standard to provide the tactile sensation. This "when the pressure load detected by the load detection unit satisfies the standard" may represent "when the pressure load detected by the load detection unit reaches a standard value to provide the tactile sensation", "when the pressure load detected by the load detection unit exceeds the standard value to provide the tactile sensation", or "when the standard value to provide the tactile sensation is detected by the load detection unit".

REFERENCE SIGNS LIST 11 touch sensor
11a touch face
12 load detection unit
13 tactile sensation providing unit
14 display unit
15 control unit
21 housing
22 insulator
23 upper cover
24 insulator
31 strain gauge sensor
32 piezoelectric vibrator

The invention claimed is:

1. An input apparatus comprising:
a touch sensor detecting contact of an object pressing a touch face of the touch sensor;
a load detector detecting pressure load of the contact on the touch face of the touch sensor with the object pressing the touch face of the touch sensor;
a tactile sensation provider vibrating the touch face with a predetermined driving signal having a frequency, period, waveform and vibration amplitude; and
a controller monitoring contact detected by the touch sensor and the pressure load detected by the load detector when contact is a slide input, and
when contact is the slide input,
control drive of the tactile sensation provider, when a position of the slide input detected by the touch sensor moves from outside of an input object into the input object while the pressure load detected by the load detector satisfies a predetermined pressure load for detecting a pressing input to operate the input object, such that a first vibrating tactile sensation is provided to the object pressing the touch face only when entering the input object, and
when the position of the slide input continues to move through the inside and then out of the input object, control drive of the tactile sensation provider, in response to the position of the contact detected by the touch sensor moving from inside of the input object to outside of the input object while the pressure load detected by the load detector continues to satisfy the predetermined pressure load, such that a second vibrating tactile sensation different from the first vibrating tactile sensation is provided to the object pressing the touch face only when exiting the input object,
wherein
the first vibrating tactile sensation corresponds to a state of the input object being depressed, and the second vibrating tactile sensation corresponds to a state of the input object being recovered to an unpressed state, and
wherein the first vibrating tactile sensation has the predetermined driving signal that produces a click sensation and the second vibrating tactile sensation has the predetermined driving signal that produces a release sensation.

2. The input apparatus according to claim 1, further comprising
a display displaying the input object,
wherein the controller is configured to change a display state of the input object as the position of the detected contact moves into the input object.

3. The input apparatus according to claim 1, further comprising
a display displaying the input object,
wherein the controller is configured to change a display state of the input object as the position of the detected contact moves out of the input object.

* * * * *